(12) United States Patent
Wooten

(10) Patent No.: US 11,709,320 B2
(45) Date of Patent: Jul. 25, 2023

(54) MODE CONVERTER FOR OPTICAL FIBER-TO-THIN FILM LITHIUM NIOBATE COUPLING

(71) Applicant: Photonic Systems, Inc., Billerica, MA (US)

(72) Inventor: Edward Wooten, San Jose, CA (US)

(73) Assignee: Photonic Systems. Inc., Billerica, MA (US)

( * ) Notice: Subject to any disclaimer, the term of this patent is extended or adjusted under 35 U.S.C. 154(b) by 0 days.

(21) Appl. No.: 17/590,196

(22) Filed: Feb. 1, 2022

(65) Prior Publication Data
US 2022/0252791 A1    Aug. 11, 2022

Related U.S. Application Data

(60) Provisional application No. 63/144,629, filed on Feb. 2, 2021.

(51) Int. Cl.
*G02B 6/30* (2006.01)
*G02B 6/122* (2006.01)
*G02B 6/14* (2006.01)
*G02B 6/12* (2006.01)

(52) U.S. Cl.
CPC ......... *G02B 6/305* (2013.01); *G02B 6/12004* (2013.01); *G02B 6/1228* (2013.01); *G02B 6/14* (2013.01)

(58) Field of Classification Search
CPC .... G02B 6/1228; G02B 6/12004; G02B 6/14; G02B 6/305
See application file for complete search history.

(56) References Cited

U.S. PATENT DOCUMENTS

2017/0045686 A1* 2/2017 Lee ................. G02B 6/1228
2021/0382232 A1* 12/2021 He .................. G02B 6/1228

OTHER PUBLICATIONS

Yao et al., "Efficient light coupling between an ultra-low loss lithium niobate waveguide and an adiabatically tapered single mode optical fiber", Optics Express, vol. 28, No. 8, Apr. 13, 2020, pp. 12416-12423.
He et al., "Low-loss fiber-to-chip interface for lithium niobate photonic integrated circuits", URL: https://arxiv.org/pdf/1902.08969.pdf, 2019, pp. 1-5.

* cited by examiner

*Primary Examiner* — Michael P Mooney
(74) *Attorney, Agent, or Firm* — Rauschenbach Patent Law Group, PLLC; Kurt Rauschenbach

(57) ABSTRACT

An optical mode converter includes a silicon substrate and a silicon dioxide film deposited on a top surface of the silicon substrate. A lithium niobate waveguide positioned on the silicon dioxide film having a slab and a rib that both taper in a direction of beam propagation through the optical mode converter. A doped silicon dioxide waveguide is positioned on top of the lithium niobate waveguide and has a slab that tapers in the direction of the optical beam propagation through the optical mode converter. The optical mode converter expands an optical mode of the optical beam propagating through the optical mode converter from a first optical mode size to a second optical mode size.

16 Claims, 6 Drawing Sheets

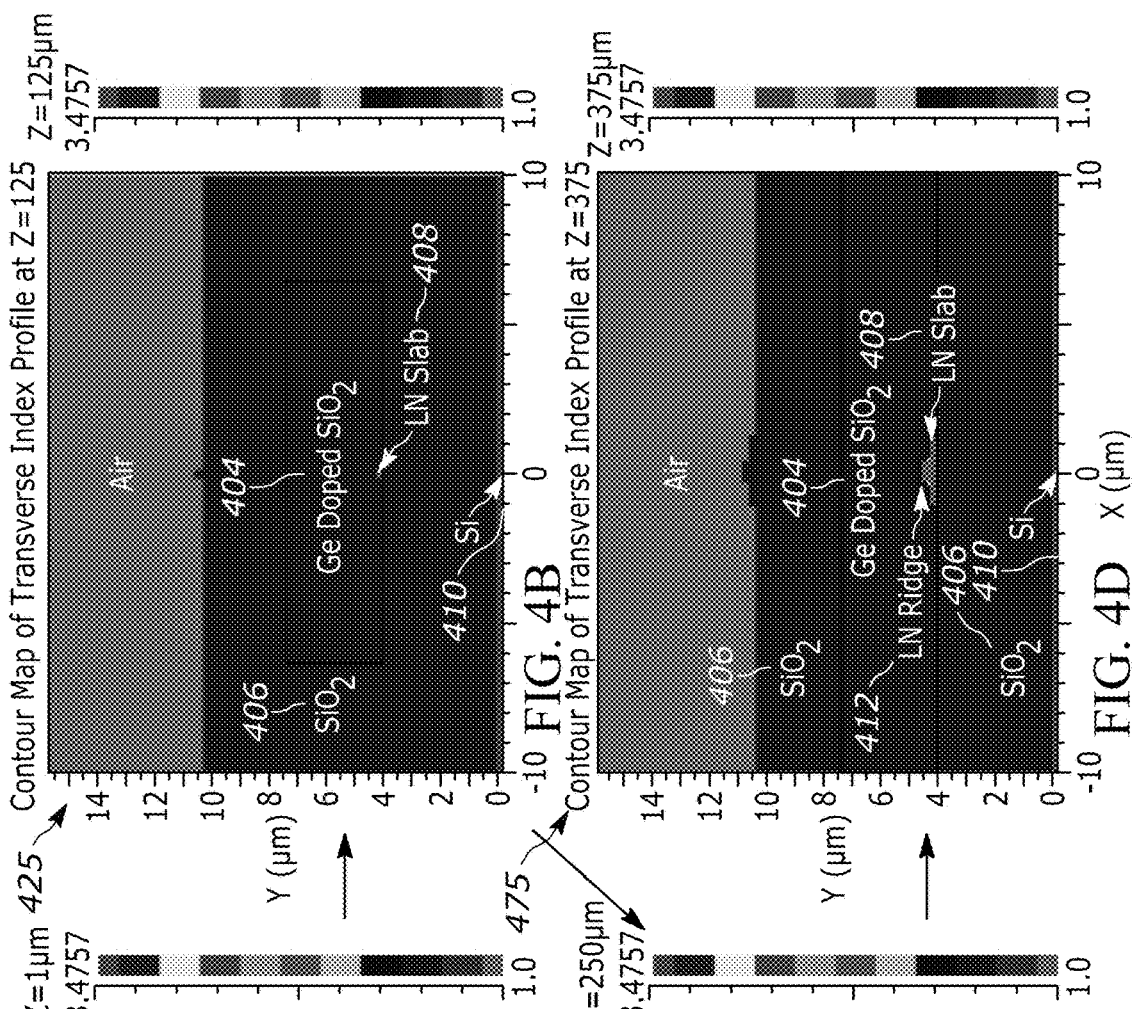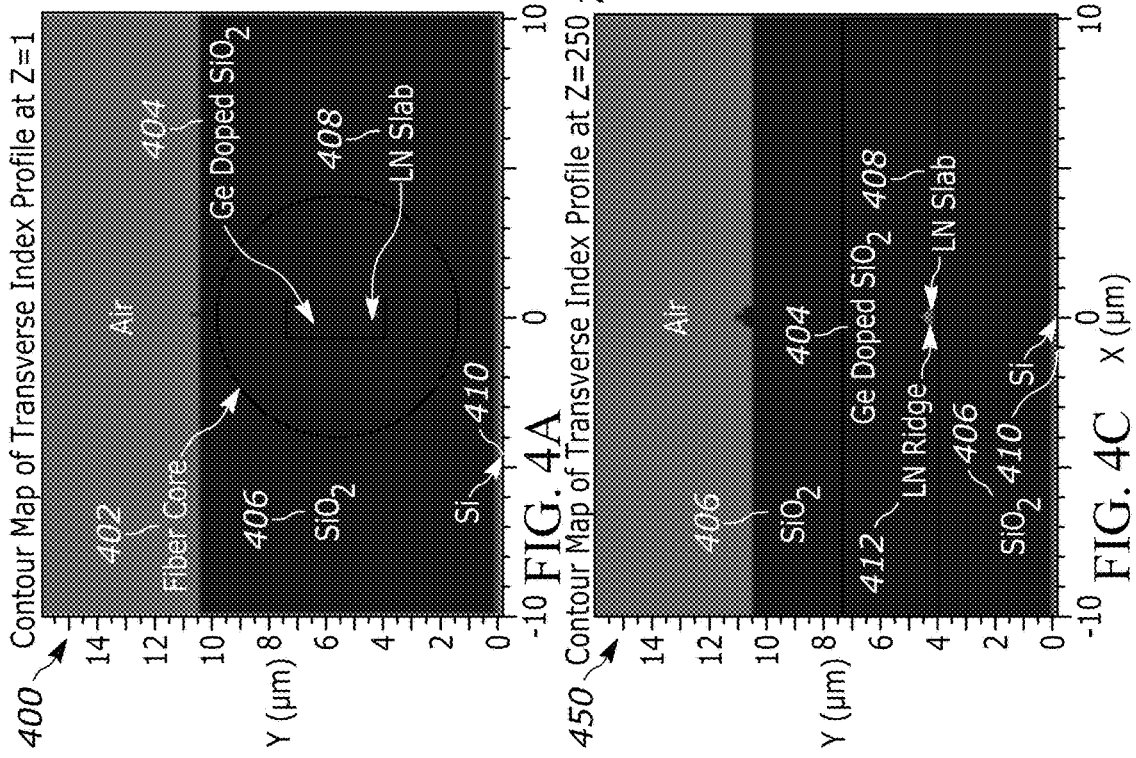

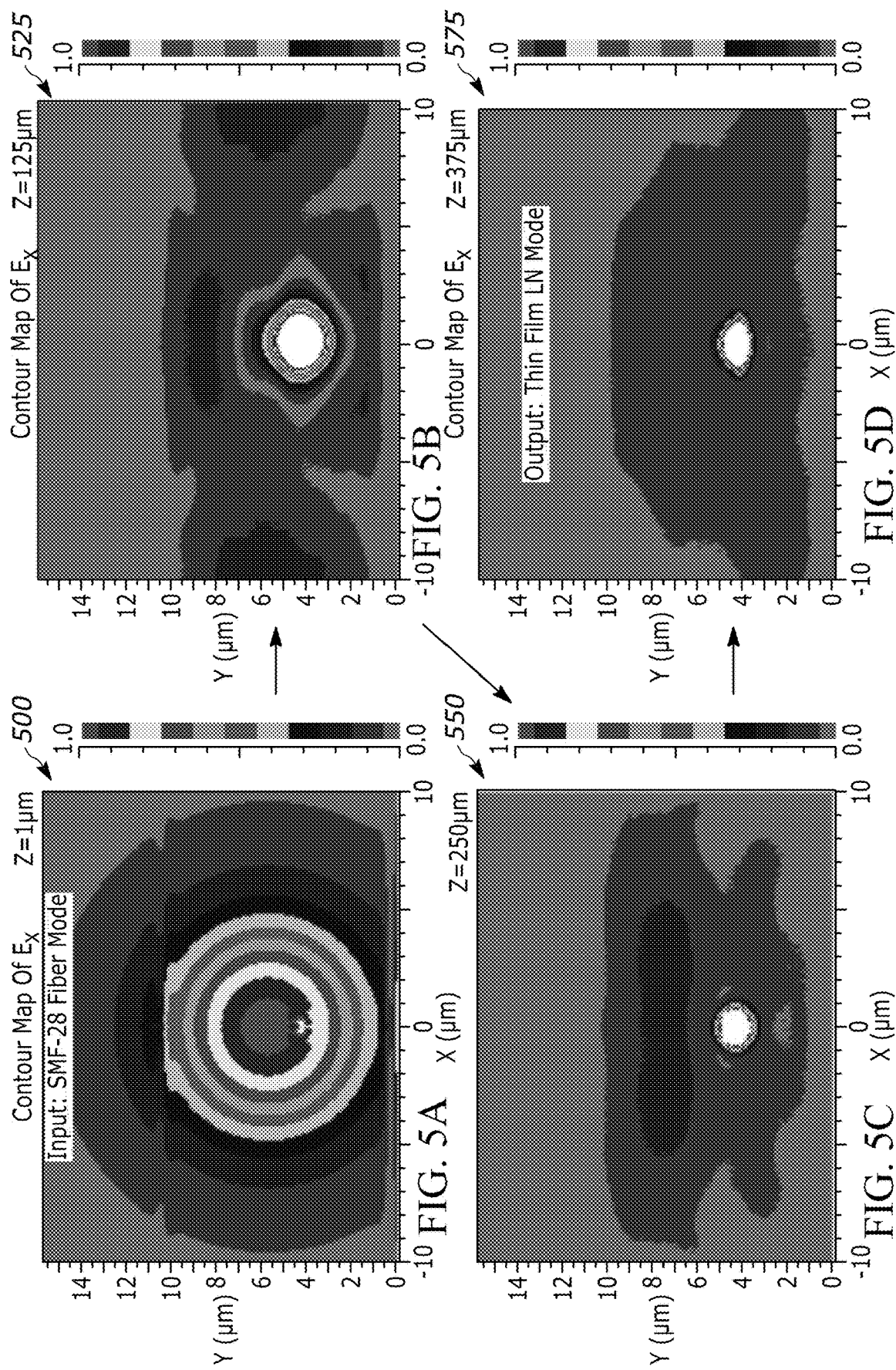

MODE CONVERTER FOR OPTICAL FIBER-TO-THIN FILM LITHIUM NIOBATE COUPLING

CROSS REFERENCE TO RELATED APPLICATION

The present application is a non-provisional application of U.S. Provisional Patent Application Ser. No. 63/144,629 entitled "Mode Converter for Optical Fiber to Thin Film LiNbO3 Coupling" filed on Feb. 2, 2021. The entire content of U.S. Provisional Patent Application Ser. No. 63/144,629 is herein incorporated by reference.

INTRODUCTION

The present teaching relates to thin film lithium niobate (TFLN) photonic circuits. These devices have demonstrated significant advantages for functions such as high frequency optical modulation.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 4A presents a refractive index contour map of the transverse refractive index provided at Z equal to one micron.

FIG. 4B presents a refractive index contour map of the transverse refractive index provided at Z equal to 125 microns.

FIG. 4C presents a refractive index contour map of the transverse refractive index provided at Z equal to 250 microns.

FIG. 4D presents a refractive index contour map of the transverse refractive index provided at Z equal to 375 microns.

FIG. 5A illustrates a simulated optical electric field profile at Z equal to one micron.

FIG. 5B illustrates a simulated optical electric field profile at Z equal to 125 microns that corresponds to a position before the $LiNbO_3$ ridge.

FIG. 5C illustrates a simulated optical electric field profile at Z equal to 250 microns, which corresponds to a position into the $LiNbO_3$ ridge.

FIG. 5D illustrates a simulated optical electric field profile at Z equal to 375 microns, which corresponds to a position into the $LiNbO_3$ ridge.

DESCRIPTION OF VARIOUS EMBODIMENTS

Figure 1A:
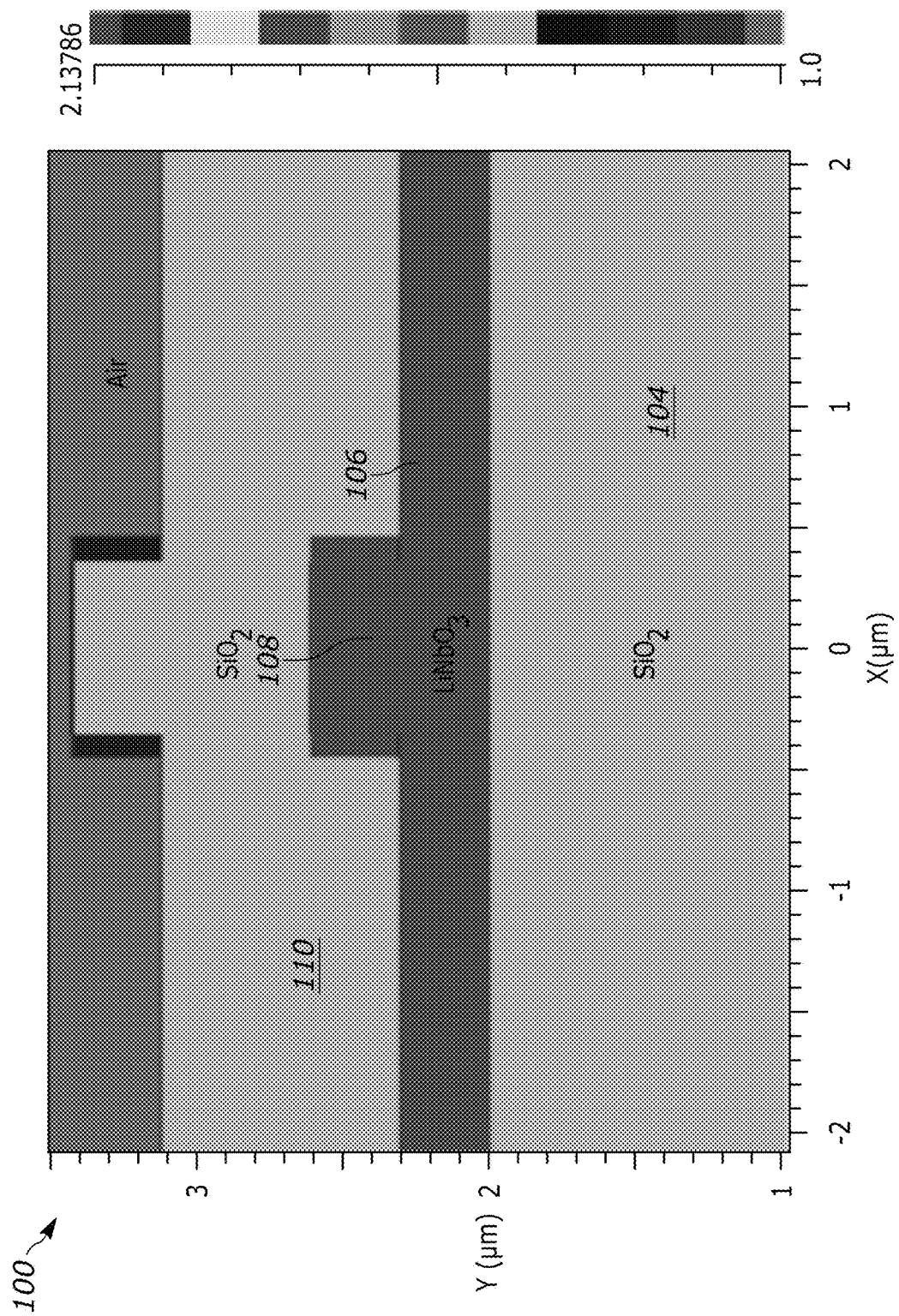
FIG. 1A illustrates a cross-sectional view of a typical thin film lithium niobate rib waveguide structure along with a color scale of the transverse refractive index profile.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

Thin film lithium niobate photonic circuits are useful for high frequency optical modulation. However, the coupling losses of thin film lithium niobate waveguides to optical fiber are currently much higher than for competing technologies due to the large difference in mode sizes between the optical fiber and the thin film lithium niobate waveguide. For example, at a wavelength of 1550 nm, the mode size of Corning SMF-28 fiber is approximately 10 μm, while the mode size of a thin film lithium niobate waveguide is only 1.2 μm.

One approach to mode matching is to taper the thin film lithium niobate waveguide. See, for example, Low-Loss Fiber-to-Chip Interface for Lithium Niobate Photonic Integrated Circuits, L He, Mian Zhang, Marko Loncar, et al., Optics Letters, 44, pp 2314-2317, 2019, which is incorporated herein by reference. The tapering expands the thin film lithium niobate mode. However, the mode can only be expanded enough to match a lensed fiber spot size of 2 μm. This small spot size combined with the twelve-micron air gap between the fiber and chip results in high sensitivity to environmental conditions, such as temperature and vibration. Coupling losses as low as 1.7 dB have been demonstrated but are not repeatable.

Another approach to mode matching is to taper the optical fiber. See, for example, Efficient Light Coupling Between an Ultra-Low Loss Lithium Niobate Waveguide and an Adiabatically Tapered Single Mode Optical Fiber, Ni Yao, et al., Optics Express V. 28, Issue 8, pp 12416-12423 (2020), which is also incorporated herein by reference. The fiber taper is typically several millimeters long and fragile as the tip diameter is only 1.4 μm. The small mode size requires precise alignment accuracy. Furthermore, because the tapered fiber requires an air-SiO₂ interface for mode confinement, it cannot be epoxied to the chip, resulting in high sensitivity to environmental conditions.

The present teaching relates to expanding the thin film lithium niobate mode by using a Ge doped waveguide on top of the thin film lithium niobate waveguide. This allows for the expansion of the mode on the thin film lithium niobate chip to match that of standard single mode fiber, allowing the fiber to be epoxied to the end of the chip. This provides a stable junction that is robust to vibration, temperature, etc. with low Fresnel reflection. In one particular embodiment of the thin film lithium niobate chip according to the present teaching, the extent of the taper on the chip is only 400 microns long. For this particular configuration, simulations predict a coupling loss of only 0.36 dB indicating that the present teaching provides a significant performance advantage over the prior art.

FIG. 1A illustrates a cross-sectional view of a typical thin film lithium niobate rib waveguide structure 100 along with a color map of the transverse refractive index profile. The waveguide structure 100 includes an SiO₂ substrate 104. In the specific embodiment corresponding to data shown in FIGS. 1A and 1B, the SiO₂ substrate thickness is about 4.0 μm thick. A lithium niobate (LiNbO₃) slab 106 is positioned on the SiO₂ substrate 104. In the specific embodiment corresponding to data shown in FIGS. 1A and 1B, the slab thickness is about 0.3 μm thick. A LiNbO₃ ridge 108 is formed in the LiNbO₃ slab 106. In the specific embodiment corresponding to data shown in FIGS. 1A and 1B, the LiNbO₃ ridge 108 width is about 0.8 μm wide and the height above the slab of the LiNbO₃ ridge 108 is about 0.3 μm high. An SiO₂ cover 110 is positioned over the LiNbO₃ ridge 108.

Figure 1B:
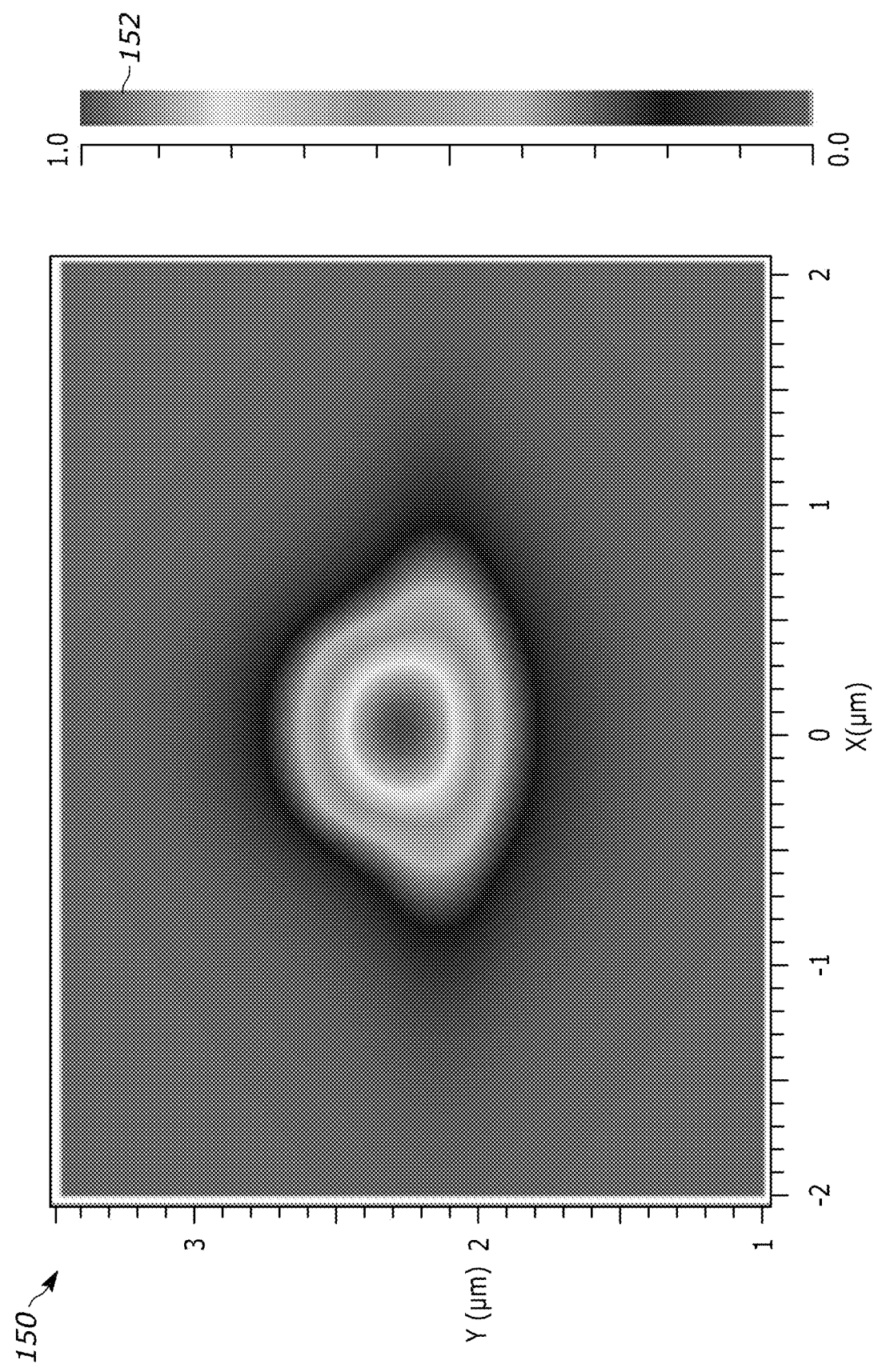
FIG. 1B presents a transverse optical mode profile at a wavelength of 1550 nm corresponding to the cross section of the thin film lithium niobate waveguide structure shown in FIG. 1A along with a color map of the transverse optical intensity profile.

FIG. 1B presents a transverse mode profile 150 corresponding to the cross section of the thin film lithium niobate waveguide structure shown in FIG. 1A along with a colormap 152 of the traverse optical electric field profile. The thin film lithium niobate rib waveguide structure of the present teaching expands the optical mode by using a transitional waveguide formed on top of the thin film lithium niobate waveguide. The refractive index of the transitional waveguide is only slightly higher than that of the SiO₂ sub-layer. The higher refractive index can be achieved using materials such as Ge doped SiO₂ or Silicon Oxynitride (SiOxNy). In embodiments using Ge doped SiO₂, the Ge concentration is chosen to achieve a desired refractive index that is slightly higher than SiO₂. For Silicon Oxynitride, the ratio of Oxygen and Nitrogen is chosen to achieve the desired refractive index between the value of ~1.45 for silicon dioxide and ~2.0 for silicon nitride.

Figure 2:
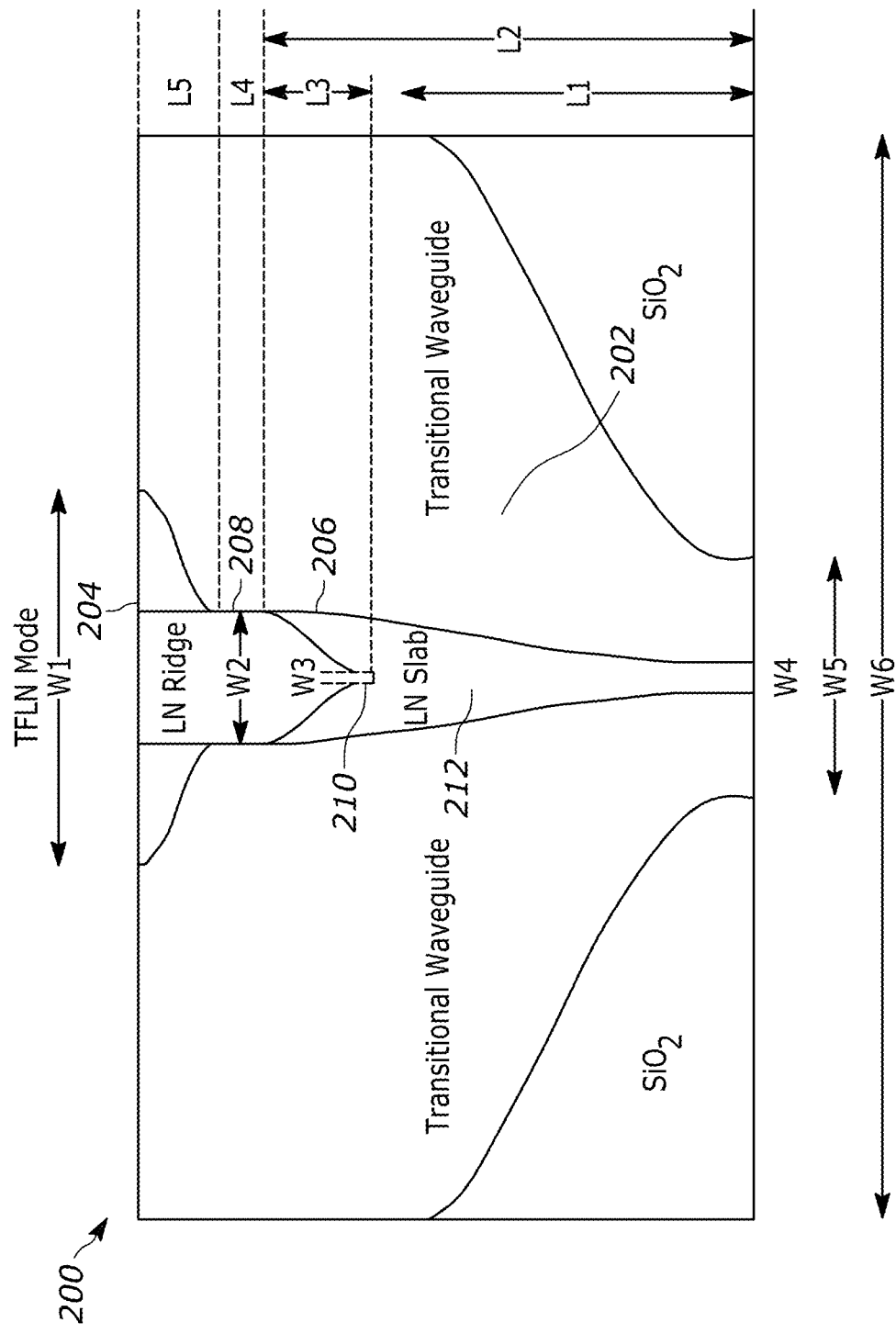
FIG. 2 illustrates an embodiment of a top-view of a mode converter for fiber-to-thin film $LiNbO_3$ ("LN" in the figure) coupling according to the present teaching showing the material structure and relative dimensions.

FIG. 2 illustrates an embodiment of a top-view of a mode converter 200 for fiber-to-thin film LiNbO₃ coupling according to the present teaching showing the material structure and relative dimensions. The width W5 is the width of the transitional LiNbO₃ waveguide 202 beginning at the fiber interface, which is chosen to optimally match the mode size of the fiber that is coupled to the mode converter 200. The transitional LiNbO₃ waveguide 202 tapers from width W5 to width W6 over length L1. In one embodiment, the transitional waveguide 202 is formed of Ge doped SiO₂ on top of an SiO₂ layer.

Between the fiber interface and the nominal thin film LiNbO₃ waveguide 206, there is a relatively straight transitional waveguide 208 having a width W2 and a length L4. A LiNbO₃ ridge 210 tapers to a width W3 at the LiNbO₃ slab 212 over length L3. The LiNbO₃ slab 212 tapers from a width of W4 to a width of W2 over length L2.

The transitional waveguide 202, LiNbO₃ slab 212, and LiNbO₃ ridge 210 can be configured so that there is a taper over a length that is relatively short compared to the length of the full thin film LiNbO₃ device. This configuration provides mode expansion on the thin film LiNbO₃ chip to match that of standard single mode fiber. The mode expansion feature allows the input optical fiber to be epoxied to the end of the chip. The mode expansion feature also provides a stable junction that is robust to vibration, temperature, etc. with low Fresnel reflection. Simulations predict coupling losses of only a fraction of a dB, which is a large performance advantage over prior art configurations.

The LiNbO₃ slab then tapers from a width of W2 to a width of W1 over length L5. The transitional waveguide material thickness and refractive index are chosen to provide optimal mode matching to the fiber. The refractive index of the transitional waveguide material is typically only a few percent higher than that of the SiO₂ sub-layer.

Devices according to one particular embodiment of the present teaching can be fabricated in the following way. According to one specific physical implementation, devices are fabricated from a 500 μm thick commercially available x-cut LiNbO₃-on-Silicon substrate, which is formed by bonding a 600 nm thick LiNbO₃ film to the top of a 4 μm thick SiO₂ film. Waveguide patterns are photolithographically defined and etched to 300 nm to produce rib waveguides in the LiNbO₃. The LiNbO₃ slab etch pattern is then photolithographically defined and etched. The transition layer is then deposited with an appropriate thickness. The transition waveguide etch pattern is photolithographically defined and etched. A final SiO₂ layer is deposited over all surfaces. The end facets of the waveguides are then etched to produce good coupling to the optical fibers. It should be understood that devices according to the present teaching can be fabricated in numerous other ways and that this is just one example.

Simulations were performed to characterize the mode converter for fiber-to-thin film LiNbO₃ coupling according to the present teaching. The particular embodiment investigated uses a Ge doped waveguide on top of the thin film LiNbO₃ waveguide. Referring to FIG. 2, the Ge doped SiO₂ tapers from a width of 1.3 μm to 20 μm. The LiNbO₃ slab tapers from a width of 0.1 μm to 0.8 μm to 2.4 μm. The LiNbO₃ rib tapers from a width of 0 μm to 0.8 μm. The total taper on the chip is only 400 μm long. The Ge doped SiO₂ is 3.4 μm thick on top of 4 μm SiO₂. Also, the Ge doped SiO₂ refractive index is 6.5% larger than that of SiO₂. Simulations predicted a coupling loss of only 0.36 dB, which is a substantial improvement over the prior art.

Figures 3A, 3B:
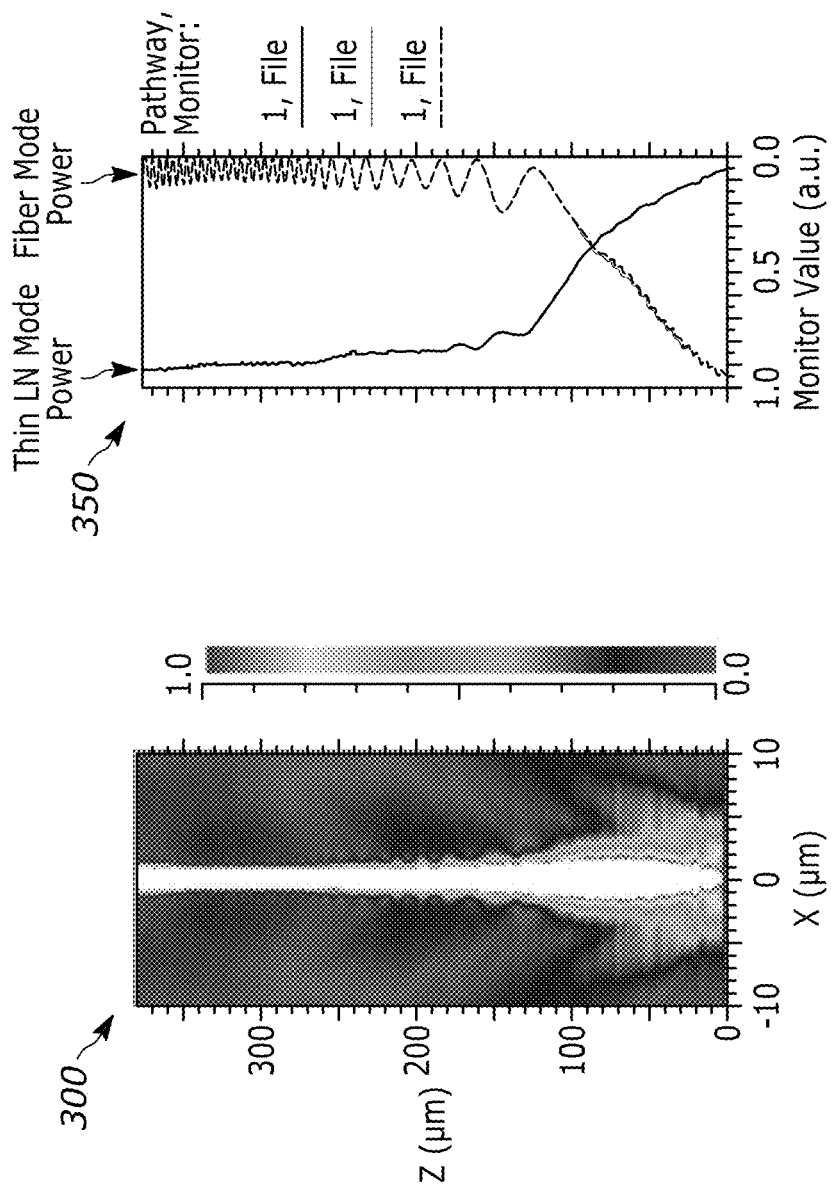
FIG. 3A presents simulated beam propagation data for the mode converter for fiber-to-thin film $LiNbO_3$ waveguide described in connection with FIG. 2.
FIG. 3B presents a simulated optical power profile corresponding to the Z-axis data presented in simulated beam propagation for the mode converter.

FIG. 3A presents simulated beam propagation data 300 for the mode converter for fiber-to-thin film LiNbO₃ waveguide described in connection with FIG. 2. The data are presented in the Z-axis as a function of the X-axis in microns.

FIG. 3B presents a simulated optical power profile 350 corresponding to the Z-axis data presented in simulated beam propagation for the mode converter. Data is presented for optical power in both the thin film LiNbO₃ waveguide and in the optical fiber. These data show that the tapered refractive index structure allows matching to a standard SMF optical fiber code with high coupling efficiency.

FIGS. 4A-D present refractive index contour maps of the traverse refractive index provided at various positions along the Z-axis, which is the direction of optical beam propagation. Referring also to FIGS. 1A and 2, FIGS. 4A-D show different features of the thin film lithium niobate rib waveguide structure along the Z-axis, such as the optical fiber core, the SiO2, doped SiO2, LiNbO$_3$ slab, LiNbO$_3$ ridge, and the silicon substrate.

FIG. 4A presents a refractive index contour map 400 of the transverse refractive index provided at Z equal to one micron. This distance on the Z axis corresponds to the optical fiber interface. The refractive index contour map 400 is presented as a cross-section in the X-Y plane with dimension in microns and shows the optical fiber core 402, the GE doped SiO$_2$ 404, the SiO$_2$ material 406, the LiNbO$_3$ slab 408 (denoted "LN Slab" in FIG. 4A), and the silicon substrate 410. The LiNbO$_3$ slab is described in more detail in connection with FIGS. 1A and 2.

FIG. 4B presents a refractive index contour map 425 of the transverse refractive index provided at Z equal to 125 microns. The refractive index contour map 425 is presented as a cross-section in the X-Y plane with dimension in microns and shows the GE doped SiO$_2$ 404, the SiO$_2$ material 406, the LiNbO$_3$ slab 408 (denoted "LN Slab" in FIG. 4B), and the silicon substrate 410. This distance on the Z axis corresponds to a position before the LiNbO$_3$ ridge 412 that is shown in FIGS. 4C and 4D.

FIG. 4C presents a refractive index contour map 450 of the transverse refractive index provided at Z equal to 250 microns. The refractive index contour map 450 is presented as a cross-section in the X-Y plane with dimension in microns and shows the GE doped SiO$_2$ 404, the SiO$_2$ material 406, the LiNbO$_3$ slab 408 (denoted "LN Slab" in FIG. 4C), and the silicon substrate 410. This distance on the Z axis corresponds to a position at the LiNbO$_3$ ridge 412.

FIG. 4D presents a refractive index contour map 475 of the transverse refractive index provided at Z equal to 375 microns. The refractive index contour map 475 is presented as a cross-section in the X-Y plane with dimension in microns and shows the GE doped SiO$_2$ 404, the SiO$_2$ material 406, the LiNbO$_3$ slab 408, and the silicon substrate 410. This distance on the Z axis corresponds to a position into the LiNbO$_3$ ridge 412. The LiNbO$_3$ slab and LiNbO$_3$ slab 408 are described in more detail in connection with FIGS. 1A and 2.

FIGS. 5A-D illustrate simulated optical power profiles at various locations along the direction of optical beam propagation in the Z-axis that correspond to the refractive index contour maps shown in FIGS. 4A-4D. FIG. 5A illustrates a simulated optical power profile 500 at Z equal to one micron. This distance on the Z axis corresponds to the optical fiber interface. In this case, the optical power profile at an end face of a SMF-28 is shown. SMF-28 is a commonly used single mode fiber manufactured by Corning.

FIG. 5B illustrates a simulated optical power profile 525 at Z equal to 125 microns that corresponds to a position before the LiNbO$_3$ ridge 412. FIG. 5C illustrates a simulated optical power profile 550 at Z equal to 250 microns, which corresponds to a position at the LiNbO$_3$ ridge 412. FIG. 5D illustrates a simulated optical power profile 575 at Z equal to 375 microns, which corresponds to a position into the LiNbO$_3$ ridge 412.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. An optical mode converter comprising:
    a) a silicon substrate;
    b) a silicon dioxide film deposited on a top surface of the silicon substrate;
    c) a lithium niobate waveguide positioned on the silicon dioxide film having a slab and a rib that both taper in a direction of beam propagation through the optical mode converter; and
    d) a doped silicon dioxide waveguide positioned on top of the lithium niobate waveguide and having a slab that tapers in the direction of the optical beam propagation through the optical mode converter,
        wherein the optical mode converter expands an optical mode of the optical beam propagating through the optical mode converter from a first optical mode size to a second optical mode size.

2. The optical mode converter of claim 1 wherein the optical mode converter is configured as a lithium niobate photonic circuit.

3. The optical mode converter of claim 1 wherein the second optical mode size is larger than the first optical mode size.

4. The optical mode converter of claim 1 further including a silicon dioxide layer that is deposited over the doped silicon dioxide waveguide.

5. The optical mode converter of claim 1 wherein a size of the first optical mode is about 1.2 microns and a size of the second optical mode is greater than 4.0 microns.

6. The optical mode converter of claim 1 wherein the slab of the doped silicon dioxide waveguide tapers from about 1.3 microns to about 20 microns in the direction of beam propagation through the optical mode converter.

7. The optical mode converter of claim 1 wherein the rib tapers from about 0.1 microns to about 0.8 microns.

8. The optical mode converter of claim 1 wherein the doped silicon dioxide waveguide has a thickness of about 3.4 microns.

9. The optical mode converter of claim 1 wherein the lithium niobate waveguide further comprises at least one etched end facet.

10. The optical mode converter of claim 9 further comprising an optical fiber attached to the at least one of the etched end facet.

11. The optical mode converter of claim 10 wherein the optical fiber is attached using an epoxy material.

12. The optical mode converter of claim 1 wherein the lithium niobate waveguide comprises a thin film lithium niobate waveguide having a thickness of about 600 nm.

13. The optical mode converter of claim 1 wherein the doped silicon dioxide waveguide positioned on top of the lithium niobate waveguide comprises a germanium doped silicon dioxide waveguide.

14. The optical mode converter of claim 1 wherein the doped silicon dioxide waveguide positioned on top of the lithium niobate waveguide comprises a silicon oxynitride waveguide.

15. The optical mode converter of claim 1 wherein the refractive index of the doped silicon dioxide waveguide is higher than the refractive index of the silicon dioxide film.

16. The optical mode converter of claim 1 wherein the lithium niobate waveguide comprises a transitional waveguide.

* * * * *